US012663357B2

(12) United States Patent
Alqahtani et al.

(10) Patent No.: US 12,663,357 B2
(45) Date of Patent: Jun. 23, 2026

(54) DIGITAL PORTABLE MAGENTIC PARTICLE TESTER

(71) Applicant: SAUDI ARABIAN OIL COMPANY, Dhahran (SA)

(72) Inventors: Abdullah A. Alqahtani, Dhahran (SA); Subindas Melapurakkal Mohandas, Dammam (SA); Saeed A. Salah, As Saffaniyah (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 141 days.

(21) Appl. No.: 18/423,461

(22) Filed: Jan. 26, 2024

(65) Prior Publication Data

US 2025/0244224 A1 Jul. 31, 2025

(51) Int. Cl.
G01N 15/1031 (2024.01)
G01N 15/1429 (2024.01)
G01N 15/1434 (2024.01)

(52) U.S. Cl.
CPC ..... G01N 15/1031 (2013.01); G01N 15/1431 (2013.01); G01N 15/1434 (2013.01)

(58) Field of Classification Search
CPC ........... G01N 15/1031; G01N 15/1431; G01N 15/1434

(Continued)

(56) References Cited

U.S. PATENT DOCUMENTS 9,618,374 B2 * 4/2017 Henry ........................ G01F 1/84
9,632,154 B2 * 4/2017 Prado ................... G01R 33/243

(Continued)

FOREIGN PATENT DOCUMENTS

| CN | 209911288 U | 1/2020 | |
| CN | 215297248 U | 12/2021 | |
| CN | 219201453 U | 6/2023 | |
| WO | WO-2018183939 A1 * | 10/2018 | ......... G01N 15/1456 |
| WO | WO-2021207175 A1 * | 10/2021 | ............. G01K 13/00 |

OTHER PUBLICATIONS

Zhang, Xiaojun, et al. "Optimization design and flexible detection method of wall-climbing robot system with multiple sensors integration for magnetic particle testing." Sensors 20.16 (2020): 4582. (Year: 2020).*

(Continued)

*Primary Examiner* — Christopher P Mcandrew

(74) *Attorney, Agent, or Firm* — Vorys, Sater, Seymour and Pease LLP

(57) ABSTRACT

A digital portable magnetic particle tester (MPT) for performing magnetic particle inspection includes a yoke body providing a handle, a pair of poles extending from the yoke body and operable to induce a magnetic field for magnetizing a test object, a camera mounted to the yoke body between the pair of poles and operable to photograph a surface of the test object, a smart digital processor positioned within the yoke body and operable to determine a location of the MPT, a digital screen that receives test information, a slot defined in the yoke body and sized to receive a removable flash memory card, and an antenna. The removable flash memory card is operable to store, and the antenna to transmit to a remote device via a network, the test information, one or more photographs or video of the surface of the test object, and the location of the MPT.

20 Claims, 3 Drawing Sheets

(58) Field of Classification Search
USPC ........................................................ 324/200
See application file for complete search history.

(56) References Cited

U.S. PATENT DOCUMENTS

2002/0033448 A1*    3/2002    Berger ................. H01J 49/288
                                                              250/296
2015/0122977 A1*    5/2015    Halvorsen .......... G01N 15/1436
                                                              250/214.1
2016/0021168 A1*    1/2016    Chaudhri ............ G06F 3/04883
                                                              715/740
2016/0363436 A1*    12/2016   Clark ................... G01N 29/265
2022/0268735 A1*    8/2022    Sheldon ............. G01N 27/9073

OTHER PUBLICATIONS

Li, Haoran, et al. "Multiphysics structured eddy current and thermography defects diagnostics system in moving mode." IEEE Transactions on Industrial Informatics 17.4 (2020): 2566-2578. (Year: 2020).*

Lee, Jinyi, and Jiseong Hwang. "Nondestructive evaluation using dipole model analysis with a scan type magnetic camera." ICMIT 2005: Information Systems and Signal Processing. vol. 6041. SPIE, 2006. (Year: 2006).*

Chen, Yanting, et al. "A novel thermography-based dry magnetic particle testing method." IEEE Transactions on Instrumentation and Measurement 71 (2022): 1-9. (Year: 2022).*

Translation of CN 219201453 (Year: 2023).*

Forrey, Arden W., et al. "Logical observation identifier names and codes (LOINC) database: a public use set of codes and names for electronic reporting of clinical laboratory test results." Clinical chemistry 42.1 (1996): 81-90. (Year: 1996).*

Xiang Cai, et al., Visual inspection method of steel pipe surface cracks based on dry magnetic particle feature enhancement, Non-destructive Testing and Evaluation, (2023) 38:2, 254-274.

Kuwae, Ryokyo & Uetake, Ichizo & Ito, Hideyuki. (1975). Magnetic Particle Inspection by the Yoke Method With a Rotating Magnetic Field.. 17. 1-8.

Sacarea, Andreea & Oancea, Gheorghe & PARV, Luminita. (2021). Magnetic Particle Inspection Optimization Solution within the Frame of NDT 4.0. Processes. 9. 1067. 10.3390/pr9061067.

* cited by examiner

DIGITAL PORTABLE MAGENTIC PARTICLE TESTER

FIELD OF THE DISCLOSURE

The present disclosure relates generally to magnetic particle testing and testing devices and, more particularly, to digital portable magnetic particle tester systems and methods of use.

BACKGROUND OF THE DISCLOSURE

Magnetic particle inspection (MPI) is a nondestructive testing process where a magnetic field is used for detecting surface, and shallow subsurface, discontinuities in ferromagnetic materials. Examples of ferromagnetic materials include iron, nickel, cobalt, and some of their alloys. The MPI process conveys a magnetic field into a subject part by directly or indirectly magnetizing the part. Direct magnetization occurs when the electric current is passed through the subject part and a magnetic field is formed in the material. Indirect magnetization occurs when no electric current is passed through the subject part, but a magnetic field is applied from an outside source.

A magnetic yoke is a hand-held device that induces a magnetic field between two poles. Common applications are for outdoor use, remote locations, and weld inspection. The drawback of analog magnetic yokes is that large-scale inspections using the device can be time-consuming and produce inaccurate test results. For proper inspection the yoke needs to be rotated 90 degrees for every inspection area to detect horizontal and vertical discontinuities. Magnetic yokes can employ dry magnetic powders, wet powders, or aerosols to identify an area of flux leakage to further discontinuities in the ferromagnetic material.

SUMMARY OF THE DISCLOSURE

Various details of the present disclosure are hereinafter summarized to provide a basic understanding. This summary is not an exhaustive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, a digital portable magnetic particle tester (MPT) for performing magnetic particle inspection can include a yoke body providing a handle. A pair of poles can extend from the yoke body and be operable to induce a magnetic field for magnetizing a test object. A camera can be mounted to the yoke body between the pair of poles and be operable to photograph a surface of the test object once magnetized by the pair of poles. A smart digital processor can be positioned within the yoke body and operable to determine a location of the MPT. The MPT can also include a digital screen that receives test information. A slot can be defined in the yoke body and sized to receive a removable flash memory card operable to store the test information, one or more photographs or video of the surface of the test object, and the location of the MPT. Additionally, the MPT can include an antenna operable to transmit the test information, one or more photographs or video of the surface of the test object, and the location of the MPT to a remote device via a network.

According to another embodiment consistent with the present disclosure, a method for performing magnetic particle inspection with a digital portable magnetic particle tester (MPT), can include placing a pair of poles of the MPT in contact with a surface of a test object. The MPT can further includes a yoke body providing a handle, a camera mounted to the yoke body between the pair of poles, a smart digital processor positioned within the yoke body, and a digital screen mounted to the yoke body. The method can further include manually entering test information to the MPT via the digital screen. Further, the method can include generating a magnetic field with the pair of poles and thereby magnetizing the surface of the test object and obtaining one or more photographs or video of the surface with the camera. Furthermore, the method can include determining location information of the MPT with the smart digital processor, as well as associating the one or more photographs or video of the surface with the test information and the location information with the smart digital processor. Additionally, the method can include storing the one or more photographs or video of the surface associated with the test information and the location information in a permanent electronic record with the smart digital processor.

According to yet another embodiment of the present disclosure, a machine-readable storage medium can have stored thereon a computer program for performing a magnetic particle inspection of a surface of a test object with a digital portable magnetic particle tester (MPT), the computer program comprising a routine of set instructions for causing the MPT to perform the step of receiving, via a digital screen mounted to a yoke body of the MPT, test information. The MPT can further include a pair of poles extending from the yoke body to contact the surface of the test object, a camera mounted to the yoke body between the pair of poles, a smart digital processor positioned within the yoke body, and a handle provided by the yoke body. The routine set of instruction can further cause the MPT to perform the steps of obtaining one or more photographs or video of the surface with the camera and determining location information of the MPT with the smart digital processor. Further, the routine set of instruction can further cause the MPT to perform the step of associating the one or more photographs or video of the surface with the test information and location information with the smart digital process. Additionally, the routine set of instruction can further cause the MPT to perform the step of storing the one or more photographs or video of the surface associated with the test information and the location information in a permanent electronic record with the smart digital processor.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1:
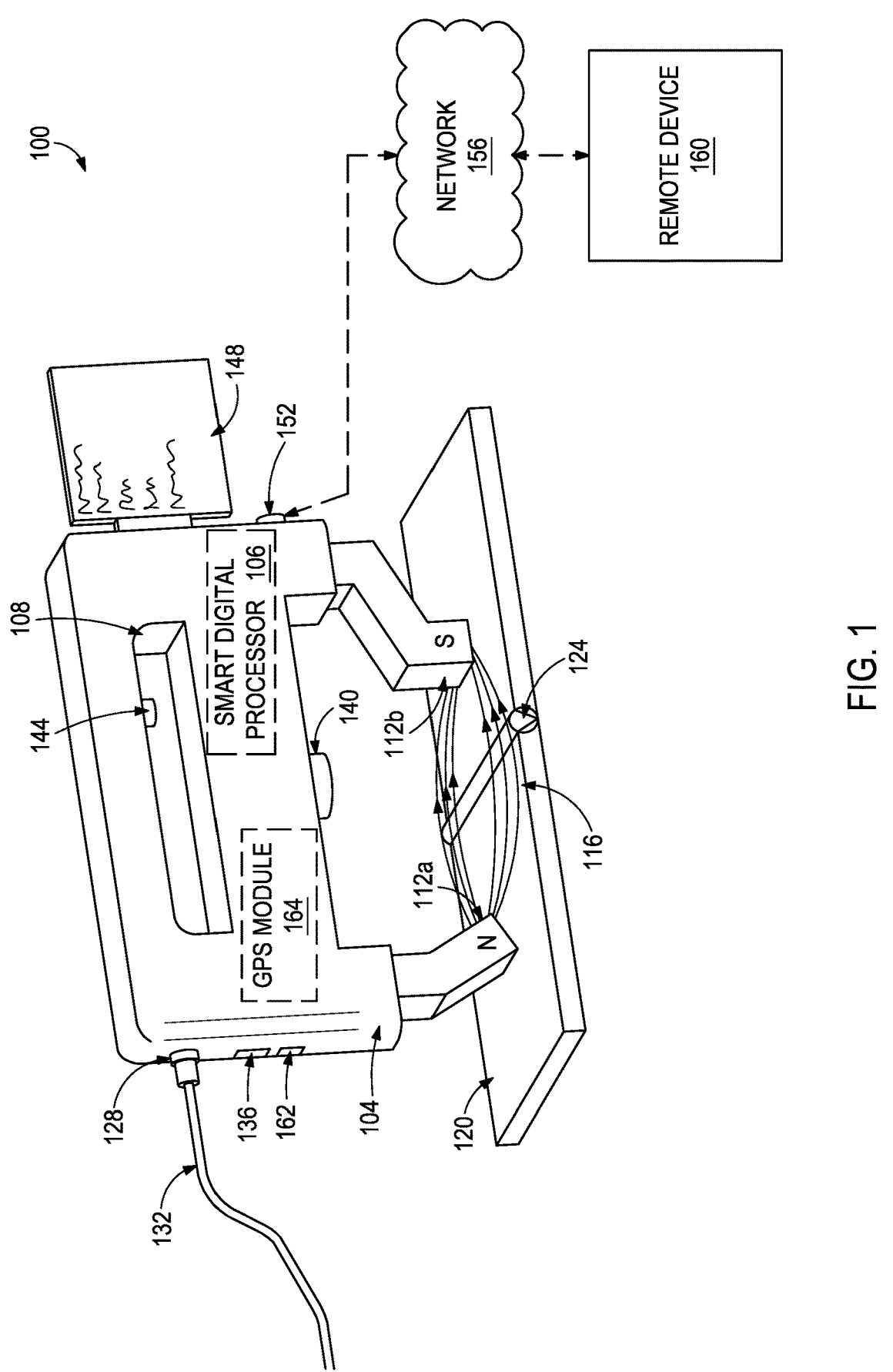
FIG. 1 is a schematic, isometric view of an example portable digital magnetic particle tester, in accordance with the principles of the present disclosure.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate to magnetic particle testing and, more particularly, to systems and methods for a digital portable MPT. The present disclosure is directed to a digital portable magnetic particle tester (MPT). The digital portable MPT can be equipped with digital electronics, such as a smart digital processor, a camera, and a global positioning system (GPS) module. Accordingly, the MPT can be employed to record photographs or video (or both) of a test or magnetic particle inspection (MPI). The MPT can also perform navigation tracking by recording locations and positions of the MPT via the GPS module, which can further be associated with photographs captured by the camera. Furthermore, the MPT can include an interactive digital screen that allows a technician to input information corresponding to the test. Therefore, the test information can also be associated with the photographs captured by the camera. Thus, the location information, test information, and photographs can be stored in a permanent electronic record. The digital portable MPT can further be equipped with Wi-Fi capabilities to communicate over a network to transmit the permanent electronic record to a remote device, as well as provide the remote device with a live video feed of the test. Because the digital portable MPT controls the permanent electronic record, the digital portable MPT curtails the possibility of potential human errors and forgeries during inspections.

FIG. 1 illustrates an example digital portable magnetic particle tester (MPT) 100 for performing magnetic particle inspection (MPI), also referred to as magnetic particle testing, in accordance with one or more embodiments of the present disclosure. As illustrated, the MPT 100 includes a yoke body 104 that houses internal components of the MPT 100, such as a computing system. As described herein, the computing system can include a smart digital processor 106.

The yoke body 104 can be formed to include or define a handle 108 that allows a user to carry and maneuver the MPT 100. The yoke body 104 can be formed from a non-ferrous material such as plastic reinforced with glass or carbon fiber, aluminum, a polymer, or composite material. Additionally, a pair of poles 112*a* and 112*b* can be attached to and extend from the yoke body 104 opposite the handle 108. The pair of poles 112*a,b* can be coupled to one or more magnets or magnetic coils within the yoke body 104 and thereby capable of creating a magnetic field 116. For example, one of the pair of poles 112*a* can be negatively charged and opposite the other pole 112*b* that is positively charged.

In example operation, the poles 112*a,b* can be physically placed on a surface of a test object 120 to be tested and induce the magnetic field 116 to magnetize the test object 120. In some applications, magnetic particles can be applied to the surface of the test object 120 that is magnetized by the magnetic field 116. Discontinuities in the surface or subsurface of the test object 120 produce interruptions in the magnetic field 116 that attract the magnetic particles. Thus, the MPT 100 can be employed to detect flaws in the surface of the test object 120 and test, for example, a weld 124 that connects portions of the test object 120. In other examples, the MPT 100 can be employed to test ferromagnetic castings and forgings for defects, such as cracks, seams, inclusions, and weld connections.

The internal components of the MPT 100 housed in the yoke body 104 can include digital electronics. As illustrated, the yoke body 104 can include a receptacle 128 to receive power from an electrical cable 132 to power the internal components of the MPT 100, such as internal digital electronics and the magnetizing coils. The yoke body 104 can further include a slot 136 for receiving a memory card. In particular, the slot 136 can be configured to receive a secure digital (SD) card, a MicroSD card, a CompactFlash (CF) card, or similar removable flash memory.

The yoke body 104 can also include a camera 140 opposite the handle 108 and facing the same direction as the poles 112*a,b*. As described herein, the camera 140 may be operable to photograph the surface of the test object 120. For example, the camera 140 can be positioned on the MPT 100 between the poles 112*a,b* to photograph/record the surface of the test object 120. In some embodiments, operation of the camera 140 can be selectively regulated by a user by manipulating a camera switch 144 positioned within the handle 108 of the yoke body 104. As a result, the user can operate the camera 140 via the camera switch 144 and maneuver the MPT 100 contemporaneously. In some embodiments, for example, the camera switch 144 can be employed by the MPT 100 as a shutter switch to photograph the surface of the test object 120. Alternatively, the camera switch 144 can activate the camera 140 to record video of the surface of the test object 120.

The yoke body 104 can further include a digital screen 148. The digital screen 148 can be a touchscreen, such as a resistive touchscreen, capacitive touchscreen, projected capacitive touch (PCT) screen, force touchscreen, or other similar screen capable of receiving input. Accordingly, the digital screen 148 can receive input from a user of the MPT 100. Particularly, the user can input information into the digital screen 148, such as the date, time, facility name, user (e.g., technician) ID, and a part number associated with the test object 120.

The yoke body 104 can further be equipped with an antenna 152 to communicate over a network 156, such as a wireless local area network (WLAN). Therefore, the antenna 152 can support frequency bands of 2.4 and 5 gigahertz (GHz) and support the Wi-Fi IEEE 802.11 standard. In other examples, the antenna 152 can communicate over a cellular network (3G, 4G, 4G LTE, 5G) or personal area network (PAN) such as Bluetooth. Moreover, the digital screen 148, the magnetic coils housed within the yoke body 104, the camera 140, and camera switch 144 can receive electrical power from the electric cable 132 via the receptacle 128 of the yoke body 104.

Because the MPT 100 is equipped with the camera 140 and the antenna 152, the MPT 100 can transmit (delayed or real-time) photographs and video captured by the camera 140 to a remote device 160. For example, the MPT 100 can photograph a test of the weld 124, store the photographs of the test on flash memory at the slot 136, and/or transmit the photographs to the remote device 160 over the network 156 via the antenna 152. In some applications, the remote device 160 can be a remote computer with a display, such as a mobile device or laptop computer. Thus, the MPT 100 can livestream the test of the weld 124 as the test is recorded by the camera 140, such that photographs (or video) of the test recorded by camera 140 are transmitted over a network by the antenna 152 in real-time. Accordingly, the livestream (e.g., recording) of the test can be received by a mobile device to display the test to the technician or another user.

Additionally, the yoke body 104 can include an interface 162. The interface 162 can be a video adapter, such as a high-definition multimedia interface (HDMI), video graphics array, or similar interface for carrying a video signal. Accordingly, the interface can facilitate coupling of the internal components of the yoke body 104 to an external monitor or a remote device 160 to display video or photographs captured by the camera 140. Furthermore, the interface 162 can be a Universal Serial Bus (USB) or PC-Bus, as well as capable of facilitating feedback from a touchscreen, such as digital screen 148.

The internal components of the MPT 100 can further include a Global Positioning System (GPS) module 164 to determine a location of the MPT 100. Therefore, the internal components such as the smart digital processor 106 of the MPT 100 can track the geographic position of the MPT 100 over time by recording the location of the MPT 100 provided by the GPS module 164. Because the internal components of the MPT 100 can track the position (location) of the MPT 100 and record the test of the test object with the camera 140, the MPT 100 can track navigation across the test object in real-time. In other examples, the MPT 100 can perform navigation tracking via the antenna 152 by employing round-trip delay of data packets sent over the network 156, such as WLAN or a cellular network.

The MPT 100 can also generate and store a permanent electronic record for the test of the test object 120. The permanent electronic record can include photographs and/or video of the test recorded by the camera 140 over time, the location of the MPT 100 over time, and the test information that is input by a user into the digital screen 148 including a Facility name, part Number, date, time, and technician ID. Each photograph recorded by the camera can therefore be associated with the test object 120, the location of the MPT 100, and the test information in the permanent electronic record. A user or technician operating the MPT 100 can record a test photograph by activating the camera switch 144, such that the MPT 100 can record and associate the test photograph with the MPT 100 location, as well as the facility name, part number, date, time and technician ID. Accordingly, the permanent electronic record can be stored in flash memory of the MPT 100 at slot 136 and transmitted to a remote device 160 via the antenna 152 or stored for later retrieval. Because technicians are conventionally required to manually enter test data, the permanent electronic record can reduce human errors by the technician and eliminate the possibility of forgeries that can occur when recording test data. Additionally, the MPT 100 can produce more accurate test data than conventional magnetic particle testers because the MPT 100 tracks the location of the MPT 100 relative to photographs of the test object 120.

Figure 2:
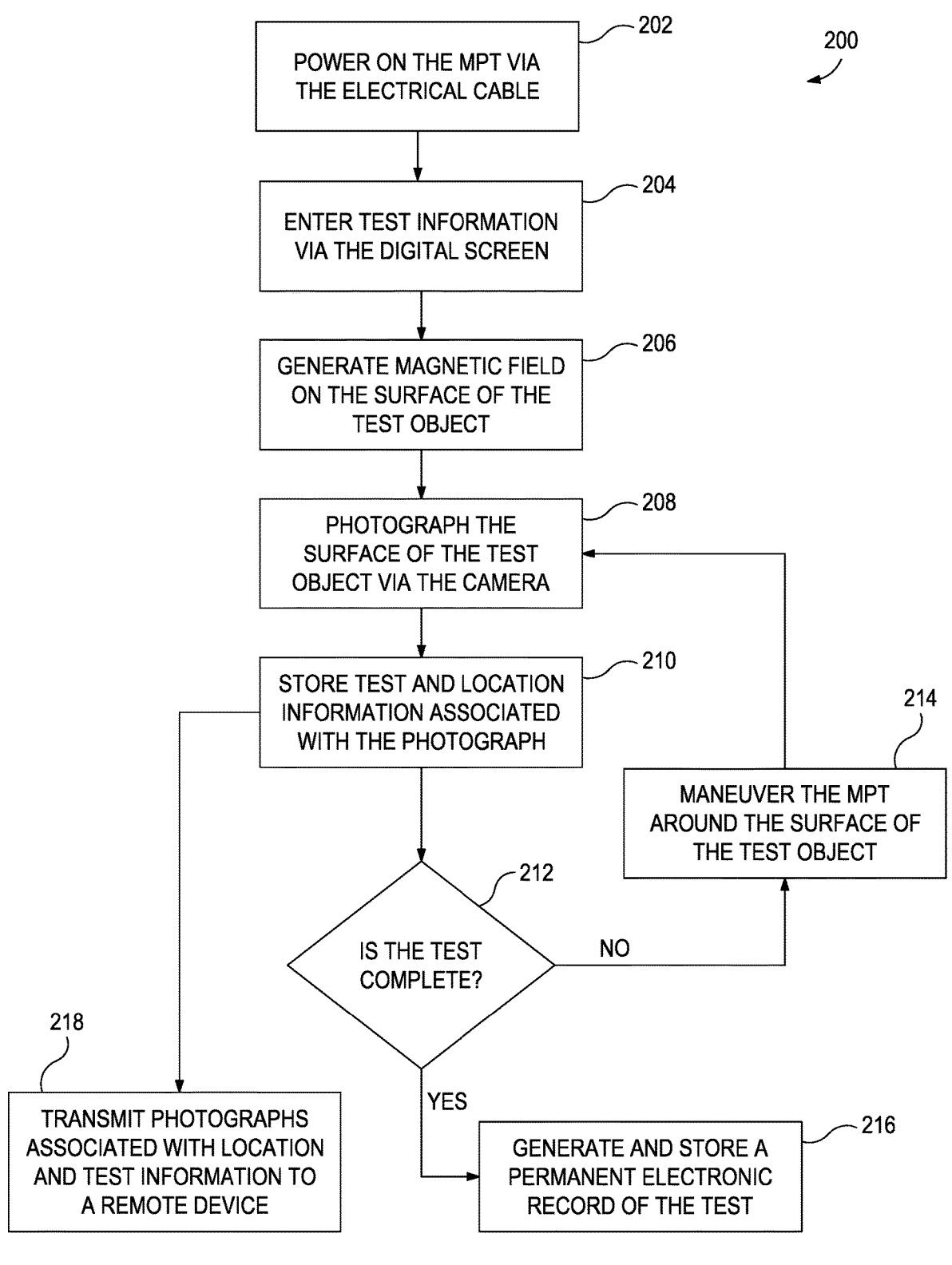
FIG. 2 is a flowchart of an example method for performing magnetic particle inspection of a test object with the portable digital magnetic particle tester of FIG. 1.

In view of the structural and functional features described above, example methods will be better appreciated with reference to FIG. 2. While, for purposes of simplicity of explanation, the example method of FIG. 2 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement the methods, and conversely, some actions may be performed that are omitted from the description.

FIG. 2 is an example of a method 200 for performing magnetic particle inspection of a test object 120 with a digital portable magnetic particle tester, in accordance with the principles of the present disclosure. The method 200 can be implemented by the MPT 100, as shown in FIG. 1. Thus, reference can be made to the example of FIG. 1. The method 200 can begin at 202 by powering the MPT 100 via an electrical cable 132, which can provide electrical power to the components of the MPT 100, such as magnetic coils circumscribing poles 112a,b, the digital screen 148, and the camera 140.

At 204, a technician, or other user of the MPT 100, can enter test information into the digital screen 148. The test information can include the date, time, facility name, a part number for the test object 120, and an ID of the technician. At 206, the poles 112a,b of the MPT 100 can be applied to (e.g., placed in physical contact with) a surface of the test object, following which a magnetic field 116 is generated by the MPT 100 on the surface of the test object. The magnetic field 116 generated by the MPT 100 can be used to detect discontinuities in the surface or sub-surface of the test object 120, which will produce interruptions in the magnetic field 116 and attract magnetic particles thereto. In some examples, power can be applied to the poles 112a,b in response to the technician selecting a corresponding element on the digital screen 148.

At 208, the technician can activate the camera 140 by pressing (actuating) the camera switch 144, and thereby take a picture (one or more still photos or video) of the surface of the test object 120 with the camera 140. At 210, the MPT 100 can associate the picture/video taken with location information of the MPT 100 and the test information input to the digital screen at 204, as well as store the associated picture, location and test information in memory, such as flash memory of the slot 136 of the MPT 100.

At 212, the MPT 100 can determine whether the test is complete. Alternatively, the technician can determine if the test is complete at 212. If "NO" and the test is incomplete, the method can proceed to 214. At 214, the technician can maneuver the MPT 100 around the surface of the test object 120, thereby altering the location information of the MPT 100, but test information such as facility name, technician ID, part number, and the date can remain the same as entered into the digital screen 148 at 204. Because the position of the MPT 100 can change at 214, the location information determined by a GPS module 164 within the MPT 100 can be updated to reflect the change in position of the MPT 100.

In response to maneuvering the MPT 100 at 214, the method 200 can repeat steps 208-212. That is, the technician can take another picture (still photo or video) of the surface of the test object 120 with the camera 140 at 208 in response to activating the camera switch 144. Because the location of the MPT 100 can change in response to maneuvering the MPT 100 at 214, the MPT 100 can associate a new location and a new test photograph with the test information entered into the digital screen 148 at 208. At 212, if the technician determines the test is complete, the MPT 100 can generate a permanent electronic record and store the permanent electronic record at 216. For example, the permanent electronic record can be an aggregate record of test photographs taken at 208 associated with location and test information at 210. At 216, the permanent record can be stored locally to the flash memory of slot 136 and transmitted via the antenna 152 to a remote device 160.

The method 200 can also be employed to implement a live stream of photographs (or video) recorded by the camera 140 and displayed by the remote device 160. For example, at 208, the camera switch 144 can be activated to initiate recording of video, or a series of photographs. Accordingly, at 210, the video can be associated and stored with the location information, as well as the test information received via the digital screen at 204. Thus, steps 208-214 can be repeated continuously for a series of photographs that constitute a video recording by the camera 140. At 218, the video recording associated with test and location information can be transmitted to a remote device 160 for displaying the recorded video as a livestream. In some examples, storing the photographs at 210 and transmitting the photographs at 218 can occur contemporaneously.

In view of the foregoing structural and functional description, those skilled in the art will appreciate that portions of the embodiments may be embodied as a method, data processing system, or computer program product. Accordingly, these portions of the present embodiments may take the form of an entirely hardware embodiment, an entirely software embodiment, or an embodiment combining software and hardware, such as shown and described with respect to the computer system of FIG. 3. Furthermore, portions of the embodiments may be a computer program product on a computer-readable storage medium having computer readable program code on the medium. Any non-transitory, tangible storage media possessing structure may be utilized including, but not limited to, static and dynamic storage devices, volatile and non-volatile memories, hard disks, optical storage devices, and magnetic storage devices, but excludes any medium that is not eligible for patent protection under 35 U.S.C. § 101 (such as a propagating electrical or electromagnetic signals per se). As an example and not by way of limitation, computer-readable storage media may include a semiconductor-based circuit or device or other IC (such, as for example, a field-programmable gate array (FPGA) or an ASIC), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. A computer-readable non-transitory storage medium may be volatile, nonvolatile, or a combination of volatile and non-volatile, as appropriate.

Certain embodiments have also been described herein with reference to block illustrations of methods, systems, and computer program products. It will be understood that blocks and/or combinations of blocks in the illustrations, as well as methods or steps or acts or processes described herein, can be implemented by a computer program comprising a routine of set instructions stored in a machine-readable storage medium as described herein. These instructions may be provided to one or more processors of a general purpose computer, special purpose computer, or other programmable data processing apparatus (or a combination of devices and circuits) to produce a machine, such that the instructions of the machine, when executed by the processor, implement the functions specified in the block or blocks, or in the acts, steps, methods and processes described herein.

These processor-executable instructions may also be stored in computer-readable memory that can direct a computer or other programmable data processing apparatus to function in a particular manner, such that the instructions stored in the computer-readable memory result in an article of manufacture including instructions which implement the function specified. The computer program instructions may also be loaded onto a computer or other programmable data processing apparatus to cause a series of operational steps to be performed on the computer or other programmable apparatus to realize a computer implemented process such that the instructions which execute on the computer or other programmable apparatus provide steps for implementing the functions specified in flowchart blocks that may be described herein.

Figure 3:
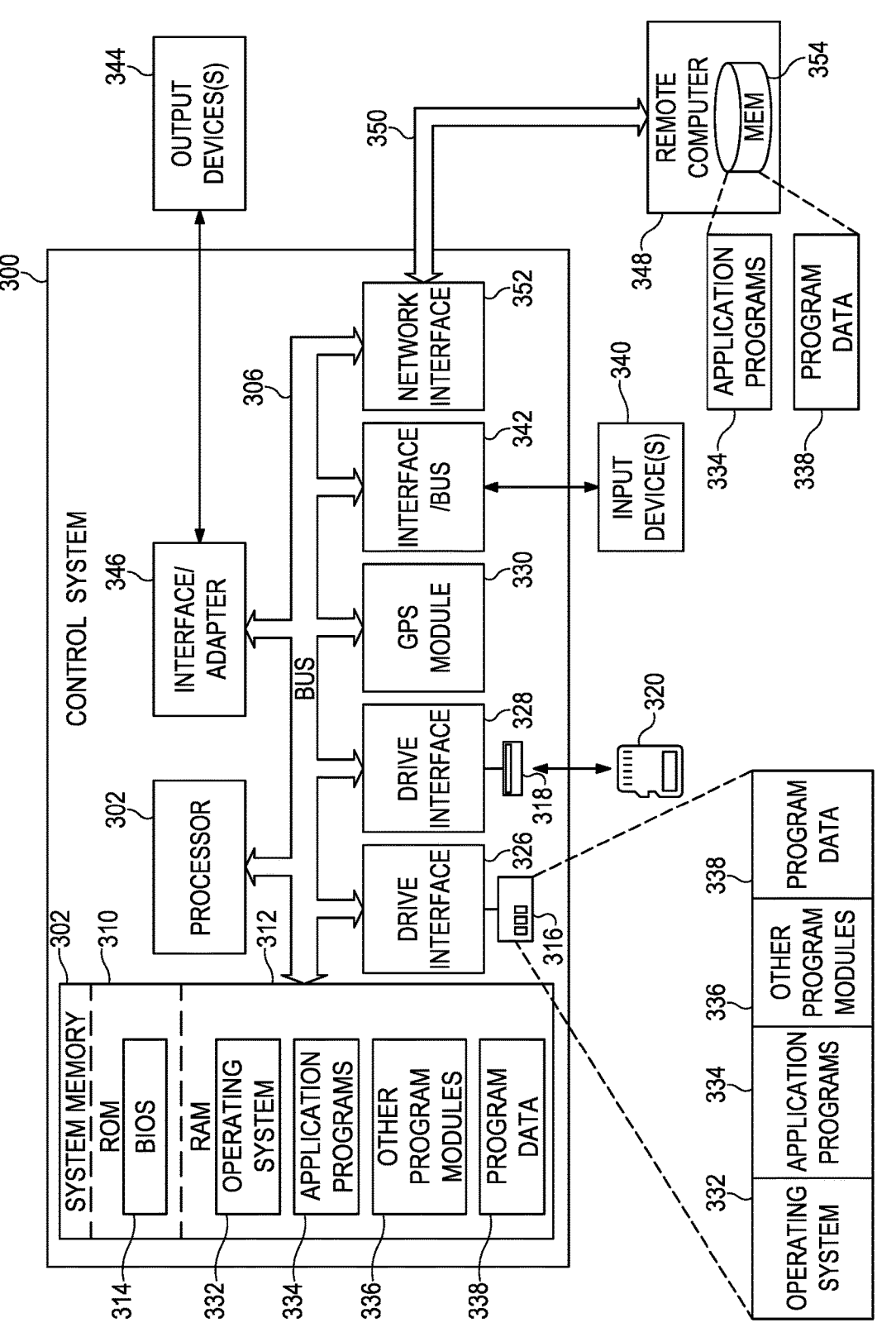
FIG. 3 is a schematic diagram of an example computing system of the portable digital magnetic particle tester of FIG. 1.

In this regard, FIG. 3 illustrates one example of a computer system 300 that can be employed to execute one or more embodiments of the present disclosure. Computer system 300 can be implemented on one or more general purpose networked computer systems, embedded computer systems, routers, switches, server devices, client devices, various intermediate devices/nodes or standalone computer systems. Additionally, computer system 300 can be implemented on various mobile clients such as, for example, a personal digital assistant (PDA), laptop computer, pager, and the like, provided it includes sufficient processing capabilities. For example, remote device 160 can be implemented as a mobile client with another computing system, such as the computer system 300.

Computer system 300 includes processing unit 302, system memory 304, and system bus 306 that couples various system components, including the system memory 304, to processing unit 302. System memory 304 can include volatile (e.g. RAM, DRAM, SDRAM, Double Data Rate (DDR) RAM, etc.) and non-volatile (e. Flash, NAND, etc.) memory. Dual microprocessors and other multi-processor architectures also can be used as processing unit 302, Moreover, the processing unit 302 can be the smart digital processor 106 of the MPT 100 of FIG. 1. System bus 306 may be any of several types of bus structure including a memory bus or memory controller, a peripheral bus, and a local bus using any of a variety of bus architectures. System memory 304 includes read only memory (ROM) 310 and random access memory (RAM) 312. A basic input/output system (BIOS) 314 can reside in ROM 310 containing the basic routines that help to transfer information among elements within computer system 300.

Computer system 300 can include a hard disk drive 316 and memory slot 318, e.g. to read from or write to removable flash memory 320. The memory slot 318 can be the slot 136 of FIG. 1 and the removable flash memory 320 can be, for example, an SD card. Hard disk drive 316 and memory slot 318 are connected to system bus 306 by a hard disk drive interface 326 and memory slot interface 328, respectively. The drives and associated computer-readable media provide nonvolatile storage of data, data structures, and computer-executable instructions for computer system 300. Although the description of computer-readable media above refers to a hard disk and removable flash memory, other types of media that are readable by a computer, such as magnetic cassettes, digital video disks and the like, in a variety of forms, may also be used in the operating environment;

further, any such media may contain computer-executable instructions for implementing one or more parts of embodiments shown and described herein.

Computer system 300 can also include a global positioning system (GPS) module 330 (e.g., the GPS module 164 of FIG. 1) to determine a location of the computer system 300 and MPT 100. The GPUS module 330 can receive signals from a network of satellites to determine the precise location of the MPT 100 by performing triangulation. In other examples, the GPS module 330 can provide the processor 302 location information via the system bus 306 to determine a location of the MPT 100. Because the GPS module 330 can be employed to determine a location of the MPT 100 over time, GPS module 330 can be further employed to perform navigation tracking of the MPT 100. Accordingly, the location and position of the MPT 100 can be tracked over time with location information provided by the GPS module 330.

A number of program modules may be stored in drives and RAI 312, including operating system 332, one or more application programs 334, other program modules 336, and program data 338. In some examples, the application programs 334 can include signal processors for determining location based on GPS signals, as well as image and video processing. The application programs 334 can also include a graphical user interface (GUI) to be displayed on an input device 340, such as the digital screen 148. The program data 338 can include test information data received by an input device 340, such as the digital screen 148. For example, the program data can include test information, such as the date, time, facility name, part number of the test object 120, and the technician ID, The program data 338 can further include location information of the MPT 100. Accordingly, the application programs 334 and program data 338 can include functions and methods programmed to record a magnetic particle inspection or test performed by the MPT 100 in a permanent digital record, such as shown and described herein.

A user may enter commands and information into computer system 300 through one or more input devices 340, such as the digital screen 148, a pointing device (e.g. a mouse, touch screen), keyboard, microphone, joystick, game pad, scanner, and the like. For instance, the user can employ input device 340 to input, edit or modify test information. These and other input devices 340 are often connected to processing unit 302 through a corresponding port interface 342 that is coupled to the system bus, but may be connected by other interfaces, such as a parallel port, serial port, or universal serial bus (USB). One or more output devices 344 (e.g., display, a monitor, printer, projector, or other type of displaying device) is also connected to system bus 306 via interface 346, such as a video adapter or high-definition multimedia interface (HDMI). For example, the interface 346 can be the interface 162 of FIG. 1. Because a digital screen 148 can be capable of displaying information as well as receiving user input, the digital screen 148 can be an output device 344 that also functions as an input device 340.

Computer system 300 may operate in a networked environment using logical connections to one or more remote computers, such as remote computer 348. Remote computer 348 may be a workstation, computer system, router, peer device, or other common network node, and typically includes many or all the elements described relative to computer system 300, The logical connections, schematically indicated at 350, can be for example the network 156 of FIG. 1. Moreover, the logical connections schematically indicated at 350 can include a local area network (LAN)

and/or a wide area network (WAN), or a combination of these, and can be in a cloud-type architecture, for example configured as private clouds, public clouds, hybrid clouds, and multi-clouds. When used in a LAN networking environment, computer system 300 can be connected to the local network through a network interface or adapter 352. Accordingly, the network interface or adaptor 352 can be the antenna 152 of FIG. 1, or interfaced with the antenna 152 of FIG. 1. When used in a WAN networking environment, computer system 300 can include a modem, or can be connected to a communications server on the LAN. The modem which may be internal or external, can be connected to system bus 306 via an appropriate port interface. In a networked environment, application programs 334 or program data 338 depicted relative to computer system 300, or portions thereof, may be stored in a remote memory storage device 354.

Embodiments disclosed herein include:

A. A digital portable magnetic particle tester (MPT) for performing magnetic particle inspection comprising a yoke body providing a handle; a pair of poles extending from the yoke body and operable to induce a magnetic field for magnetizing a test object; a camera mounted to the yoke body between the pair of poles and operable to photograph a surface of the test object once magnetized by the pair of poles; a smart digital processor positioned within the yoke body and operable to determine a location of the MPT; a digital screen that receives test information; a slot defined in the yoke body and sized to receive a removable flash memory card operable to store the test information, one or more photographs or video of the surface of the test object, and the location of the MPT; and an antenna operable to transmit the test information, one or more photographs or video of the surface of the test object, and the location of the MPT to a remote device via a network.

B. A method for performing magnetic particle inspection with a digital portable magnetic particle tester (MPT) comprising placing a pair of poles of the MPT in contact with a surface of a test object, the MPT further including a yoke body providing a handle; a camera mounted to the yoke body between the pair of poles; a smart digital processor positioned within the yoke body; and a digital screen mounted to the yoke body; the method further comprising manually entering test information to the MPT via the digital screen; generating a magnetic field with the pair of poles and thereby magnetizing the surface of the test object; obtaining one or more photographs or video of the surface with the camera; determining location information of the MPT with the smart digital processor; associating the one or more photographs or video of the surface with the test information and the location information with the smart digital processor; and storing the one or more photographs or video of the surface associated with the test information and the location information in a permanent electronic record with the smart digital processor.

C. A machine-readable storage medium having stored thereon a computer program for performing a magnetic particle inspection of a surface of a test object with a digital portable magnetic particle tester (MPT), the computer program comprising a routine of set instructions for causing the MPT to perform the steps of receiving, via a digital screen mounted to a yoke body of the MPT, test information, the MPT further including a pair of poles extending from the yoke body to contact the surface of the test object; a camera mounted to the yoke body between the pair of poles; a smart digital processor positioned within the yoke body; and a handle provided by the yoke body; the steps further including obtaining one or more photographs or video of the surface with the camera; determining location information of the MPT with the smart digital processor; associating the one or more photographs or video of the surface with the test information and location information with the smart digital process; and storing the one or more photographs or video of the surface associated with the test information and the location information in a permanent electronic record with the smart digital processor.

Each of embodiments A, B, and C may have one or more of the following additional elements in any combination: Element 1: wherein the smart digital processor is configured to associate the one or more photographs or video of the surface of the test object with the test information and location of the MPT; and store the one or more photographs or video of the surface of the test object, the test information, and location of the MPT in a permanent electronic record. Element 2: The MPT further comprising a camera switch arranged on the handle and actuatable to activate the camera. Element 3: wherein the test information comprises a part number of the test object, a facility name, an identification number for a technician operating the MPT, a date, and time. Element 4: wherein the network is a WiFi network. Element 5: wherein the MPT determines the location of the MPT based on a delay of packets sent over the network.

Element 6: The MPT further comprising a global positioning system (GPS) module that provides geographic coordinates to the smart digital processor for determining the location of the MPT. Element 7: wherein the smart digital processor performs navigation tracking of the MPT by monitoring the location of the MPT over time. Element 8: wherein the smart digital processor stores the test information associated with the location and photographs captured over time in a permanent electronic record. Element 9: wherein the smart digital processor transmits a live video feed from the camera to the remote device that displays the live video feed over the network via the antenna. Element 10: wherein the smart digital processor transmits the permanent electronic record to the remote device over the network via the antenna.

Element 11: The method further comprising transmitting the permanent electronic record to a remote device with an antenna of the MPT. Element 12: The method further comprising transmitting the one or more photographs or video recorded by the camera to a remote device with an antenna of the MPT. Element 13: wherein the test information comprises at least one of a date, a time, a technician ID, facility name, and part number for the test object, and wherein generating the magnetic field with the pair of poles comprises applying electrical power to the pair of poles in response to manually entering the test information into the digital screen. Element 14: The method further comprising tracking the location of the MPT over time using the smart digital processor and based on the location information provided by a global positioning system (GPS) module.

Element 15: the set of instructions further comprising transmitting the one or more photographs or video to a remote device with an antenna of the MPT. Element 16: the set of instructions further comprising the location of the MPT over time using the smart digital processor based on the location information provided by a global positioning system (GPS) module. Element 17: wherein the test information comprises a date, a time, a technician ID, facility name, and part number for the test object.

By way of non-limiting example, exemplary combinations applicable to A, B, and C include: Element 4 with Element 5; Element 6 with Element 7; Element 7 with Element 8; Element 8 with Element 9; and Element 9 with Element 10

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation used herein are merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

The invention claimed is:

1. A digital portable magnetic particle tester (MPT) for performing magnetic particle inspection comprising:

a yoke body providing a handle;

a pair of poles extending from the yoke body and operable to induce a magnetic field for magnetizing a test object;

a camera mounted to the yoke body between the pair of poles and operable to photograph a surface of the test object once magnetized by the pair of poles;

a smart digital processor positioned within the yoke body and operable to determine a location of the MPT;

a digital screen mounted to the yoke body and operable to receive test information in response to user input at the digital screen;

a slot defined in the yoke body and sized to receive a removable flash memory card operable to store the test information, one or more photographs or video of the surface of the test object, and the location of the MPT; and an antenna operable to transmit the test information, one or more photographs or video of the surface of the test object, and the location of the MPT to a remote device via a network.

2. The digital portable MPT of claim 1, wherein the smart digital processor is configured to:

associate the one or more photographs or video of the surface of the test object with the test information and location of the MPT; and store the one or more photographs or video of the surface of the test object, the test information, and location of the MPT in a permanent electronic record.

3. The digital portable MPT of claim 1, further comprising a camera switch arranged on the handle and actuatable to activate the camera.

4. The digital portable MPT of claim 1, wherein the test information comprises a part number of the test object, a facility name, an identification number for a technician operating the MPT, a date, and time.

5. The digital portable MPT of claim 1, wherein the network is a WiFi network.

6. The digital portable MPT of claim 5, wherein the MPT determines the location of the MPT based on a delay of packets sent over the network.

7. The digital portable MPT of claim 1, further comprising a global positioning system (GPS) module that provides geographic coordinates to the smart digital processor for determining the location of the MPT.

8. The digital portable MPT of claim 7, wherein the smart digital processor performs navigation tracking of the MPT by monitoring the location of the MPT over time.

9. The digital portable MPT of claim 8, wherein the smart digital processor stores the test information associated with the location and photographs captured over time in a permanent electronic record.

10. The digital portable MPT of claim 9, wherein the smart digital processor transmits a live video feed from the camera to the remote device that displays the live video feed over the network via the antenna.

11. The digital portable MPT of claim 10, wherein the smart digital processor transmits the permanent electronic record to the remote device over the network via the antenna.

12. A method for performing magnetic particle inspection with a digital portable magnetic particle tester (MPT), the method comprising:

placing a pair of poles of the MPT in contact with a surface of a test object, the MPT further including:

a yoke body providing a handle;

a camera mounted to the yoke body between the pair of poles;

a smart digital processor positioned within the yoke body; and a digital screen mounted to the yoke body and operable to receive test information in response to user input at the digital screen;

manually entering the test information into the digital screen of the MPT;

generating a magnetic field with the pair of poles and thereby magnetizing the surface of the test object;

obtaining one or more photographs or video of the surface with the camera;

determining location information of the MPT with the smart digital processor;

associating the one or more photographs or video of the surface with the test information and the location information with the smart digital processor; and storing the one or more photographs or video of the surface associated with the test information and the location information in a permanent electronic record with the smart digital processor.

13. The method of claim 12, further comprising transmitting the permanent electronic record to a remote device with an antenna of the MPT.

14. The method of claim 12, further comprising transmitting the one or more photographs or video recorded by the camera to a remote device with an antenna of the MPT.

15. The method of claim 12, wherein the test information comprises at least one of a date, a time, a technician ID, facility name, and part number for the test object, and wherein generating the magnetic field with the pair of poles comprises:

applying electrical power to the pair of poles in response to manually entering the test information into the digital screen.

16. The method of claim 12, further comprising tracking the location of the MPT over time using the smart digital processor and based on the location information provided by a global positioning system (GPS) module.

17. A machine-readable storage medium having stored thereon a computer program for performing a magnetic particle inspection of a surface of a test object with a digital portable magnetic particle tester (MPT), the computer program comprising a routine of set instructions for causing the MPT to perform the steps of:

receiving, in response to user interaction with a digital screen mounted to a yoke body of the MPT, test information at the digital screen, the MPT further including:

a pair of poles extending from the yoke body to contact the surface of the test object;

a camera mounted to the yoke body between the pair of poles;

a smart digital processor positioned within the yoke body; and a handle provided by the yoke body;

obtaining one or more photographs or video of the surface with the camera;

determining location information of the MPT with the smart digital processor;

associating the one or more photographs or video of the surface with the test information and location information with the smart digital process; and storing the one or more photographs or video of the surface associated with the test information and the location information in a permanent electronic record with the smart digital processor.

18. The machine-readable storage medium of claim 17, the set of instructions further comprising transmitting the one or more photographs or video to a remote device with an antenna of the MPT.

19. The machine-readable storage medium of claim 17, the set of instructions further comprising the location of the MPT over time using the smart digital processor based on the location information provided by a global positioning system (GPS) module.

20. The machine-readable storage medium of claim 17, wherein the test information comprises a date, a time, a technician ID, facility name, and part number for the test object.

* * * * *